United States Patent
Torvi et al.

(10) Patent No.: US 11,451,478 B1
(45) Date of Patent: Sep. 20, 2022

(54) DISTRIBUTED TACTICAL TRAFFIC ENGINEERING (TE) USING LOOP FREE ALTERNATIVE (LFA), REMOTE-LFA (R-LFA) AND/OR TOPOLOGY INDEPENDENT-LFA (TI-LFA) SECONDARY PATHS

(71) Applicant: Juniper Networks, Inc., Sunnyvale, CA (US)

(72) Inventors: Raveendra Torvi, Nashua, NH (US); Tarek Saad, Ottawa (CA); Jonathan C. Barth, Collegeville, PA (US); Ronald Bonica, Sterling, VA (US); Vishnu Pavan Beeram, Naperville, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 140 days.

(21) Appl. No.: 16/692,842

(22) Filed: Nov. 22, 2019

(51) Int. Cl.
*H04L 47/125* (2022.01)
*H04L 45/18* (2022.01)
*H04L 45/00* (2022.01)

(52) U.S. Cl.
CPC ............ *H04L 47/125* (2013.01); *H04L 45/18* (2013.01); *H04L 45/22* (2013.01); *H04L 45/34* (2013.01)

(58) Field of Classification Search
None
See application file for complete search history.

(56) References Cited

U.S. PATENT DOCUMENTS

| | | | | |
|---|---|---|---|---|
| 5,253,248 A * | 10/1993 | Dravida | ................. | H04L 45/00 370/228 |
| 5,495,426 A * | 2/1996 | Waclawsky | ............ | H04L 45/00 370/229 |
| 6,791,949 B1 * | 9/2004 | Ryu | ..................... | H04W 84/18 370/254 |
| 7,254,138 B2 * | 8/2007 | Sandstrom | ............. | H04L 45/00 370/252 |
| 7,583,677 B1 * | 9/2009 | Ma | ......................... | H04L 45/00 370/235 |

(Continued)

*Primary Examiner* — Gregory B Sefcheck
(74) *Attorney, Agent, or Firm* — John C. Pokotylo; Pokotylo Patent Services

(57) ABSTRACT

A tactical solution to network congestion is provided by a data forwarding device having (1) a first interface with a first link to a downstream data forwarding device and (2) second interface with a second link to a downstream data forwarding device, and executing a method comprising: (a) configuring the second interface as part of a loop-free alternate (LFA) path to a destination device, wherein the first interface is part of a shortest/preferred path to the destination device; (b) monitoring congestion at the first interface to determine whether or not the congestion exceeds a first threshold; and (c) responsive to a determination that the congestion exceeds the first threshold, forwarding at least some data addressed to the destination device, over the LFA path via the second interface instead of over the shortest/preferred path via the first interface, thereby alleviating congestion at the first interface, and otherwise, responsive to a determination that the congestion does not exceed the first threshold, not forwarding at least some data addressed to the destination device, over the LFA path via the second interface instead of over the shortest/preferred path via the first interface.

18 Claims, 13 Drawing Sheets

(56) References Cited

U.S. PATENT DOCUMENTS

| | | | |
|---|---|---|---|
| 8,036,226 B1 * | 10/2011 | Ma | H04L 45/24 370/395.21 |
| 8,438,307 B2 * | 5/2013 | Wu | H04L 45/02 709/239 |
| 8,619,769 B2 * | 12/2013 | Sandstrom | H04L 45/34 370/389 |
| 8,630,177 B2 * | 1/2014 | Vasseur | H04L 45/22 370/232 |
| 8,724,642 B2 * | 5/2014 | Miller | H04L 41/046 370/401 |
| 8,995,277 B2 * | 3/2015 | Anand | H04L 45/28 370/237 |
| 9,065,721 B2 * | 6/2015 | Nguyen | H04L 47/00 |
| 9,065,750 B2 * | 6/2015 | Vasseur | H04L 47/825 |
| 9,071,459 B2 * | 6/2015 | Layman | H04M 7/006 |
| 9,088,929 B2 * | 7/2015 | Beser | H04W 40/12 |
| 9,154,412 B2 * | 10/2015 | Wijnands | H04L 45/16 |
| 9,225,629 B2 * | 12/2015 | Lindem, III | H04L 45/22 |
| 9,253,079 B2 * | 2/2016 | Ernstrom | H04L 45/122 |
| 9,379,991 B2 * | 6/2016 | Turanyi | H04L 45/127 |
| 9,438,472 B2 * | 9/2016 | Csaszar | H04L 45/22 |
| 9,444,676 B2 * | 9/2016 | Lindem, III | H04L 41/0663 |
| 9,853,854 B1 * | 12/2017 | Sarkar | H04L 45/28 |
| 9,998,361 B2 * | 6/2018 | Kebler | H04L 67/1046 |
| 10,075,367 B2 * | 9/2018 | Yi | H04L 45/28 |
| 10,367,739 B2 * | 7/2019 | Nadas | H04L 47/125 |
| 10,462,045 B1 * | 10/2019 | Francois | H04L 41/0668 |
| 2014/0040526 A1 * | 2/2014 | Chang | H04L 43/0882 710/316 |
| 2015/0016242 A1 * | 1/2015 | Ernstrom | H04L 45/18 370/218 |
| 2015/0023173 A1 * | 1/2015 | Sharma | H04L 45/22 370/236 |
| 2019/0166045 A1 * | 5/2019 | Peng | H04L 45/22 |
| 2020/0007435 A1 * | 1/2020 | Paida | H04L 43/0894 |
| 2020/0177495 A1 * | 6/2020 | Inoue | H04L 45/08 |
| 2021/0051092 A1 * | 2/2021 | Retana | H04L 45/22 |
| 2021/0092047 A1 * | 3/2021 | Dutta | H04L 45/28 |

\* cited by examiner

DISTRIBUTED TACTICAL TRAFFIC ENGINEERING (TE) USING LOOP FREE ALTERNATIVE (LFA), REMOTE-LFA (R-LFA) AND/OR TOPOLOGY INDEPENDENT-LFA (TI-LFA) SECONDARY PATHS

§ 1. BACKGROUND OF THE INVENTION

§ 1.1 Field of the Invention

The present description concerns communications networks, and in particular, concerns alleviating congestion in communications networks.

§ 1.2 Background Information

The description of art in this section is not, and should not be interpreted to be, an admission that such art is prior art to the present invention.

A computer network is a collection of interconnected computing devices that can exchange data and share resources. Example network devices include layer two devices that operate within the second layer (i.e., L2, or the data link layer) of the Open Systems Interconnection (OSI) reference model, layer three devices that operate within the third layer (i.e., L3, or the network layer) of the OSI reference model. For example, the Internet is a large collection of host devices (e.g., personal computers, laptops, tablets, smart phones, etc.) that communicate with each other. Data is typically carried in fixed length cells called packets. Each packet may include, among other things, a source address, a destination address and a payload.

Routers may be used as intermediate packet switches to forward a packet through one or more networks until the packet reaches a router that is attached to the same network as the destination host. A router may then deliver the packet to the specified destination host on its local network. Routers keep track of so-called "next hop" information that enables a data packet to reach its destination through the network. More specifically, a router that does not have a direct physical connection to the destination checks its routing table (or its forwarding table) and forwards packets to another next-hop router that is closer to the ultimate destination of the packet. This process continues until the packet reaches its final destination.

Network devices (such as routers, switches, etc., which are generally referred to as "nodes") within computer networks are interconnected through one or more communications links, thereby defining a network topology. Such network nodes often include a control unit that provides so-called "control plane" functionality and a forwarding unit for routing and/or switching data units, such as packets for example.

§ 1.2.1 Multi-Protocol Label Switching (MPLS) and Label Switched Paths (LSPs)

Multiprotocol Label Switching (MPLS) is a method for engineering traffic patterns by assigning short labels to network packets that describe how to forward them through the network. MPLS is independent of routing tables or any routing protocol and can be used for unicast packets. More specifically, in a traditional Internet protocol (IP) network, packets are transmitted with an IP header that includes a source and destination address. When a router receives such a packet, it examines its forwarding tables for the next-hop address associated with the packet's destination address and forwards the packet to the next-hop location. On the other hand, in an MPLS network, each packet is encapsulated with an MPLS header. When a router receives the packet, it copies the header as an index into a separate MPLS forwarding table. Each entry in the MPLS forwarding table includes forwarding information that the router uses to forward the traffic and modify, when necessary, the MPLS header. Since the MPLS forwarding table has far fewer entries than the more general forwarding table, the lookup consumes less processing time and processing power. The resultant savings in time and processing are a significant benefit for traffic that uses the network to transit between outside destinations only.

Label-switched paths (LSPs) are unidirectional routes through a network or autonomous system (AS). In normal IP routing, the packet has no predetermined path. Instead, each router forwards a packet to the next-hop address stored in its forwarding table, based only on the packet's destination address. Each subsequent router then forwards the packet using its own forwarding table. In contrast, MPLS routers (within an AS) determine paths through a network through the exchange of MPLS traffic engineering information. Using these paths, the routers direct traffic through the network along an established route. Rather than selecting the next hop along the path as in IP routing, each router is responsible for forwarding the packet to a predetermined next-hop address.

Routers that are part of the LSP are referred to label-switching routers (LSRs). Each LSR must be configured with MPLS so that it can interpret MPLS headers and perform the MPLS operations required to pass traffic through the network. An LSP can include four types of LSRs. First, an ingress or inbound LSR provides the entry point for traffic into MPLS. Native IPv4 packets are encapsulated into the MPLS protocol by the ingress router. Each LSP can have only one ingress router. Second, a transit LSR is any router in the middle of an LSP. Transit LSRs forward MPLS traffic along the LSP, using only the MPLS header to determine how the packet is routed. Third, the penultimate LSR is the second-to-last router in the LSP. If penultimate hop popping (PHP) is employed, the penultimate LSR is responsible for stripping the MPLS header from the packet before forwarding it to the outbound router. Fourth, the egress or outbound LSR is the endpoint for the LSP. The egress router receives MPLS packets from the penultimate LSR and performs an IP route lookup. The egress router then forwards the packet to the next hop of the route. Each LSP can have only one outbound router.

To forward traffic through an MPLS network, MPLS routers encapsulate packets and assign and manage headers known as labels. A label is a 20-bit unsigned integer in the range 0 through 1,048,575. The routers use the labels to index the MPLS forwarding tables that determine how packets are routed through the network. When a network's inbound router receives traffic, it inserts an MPLS label between the IP packet and the appropriate Layer 2 header for the physical link. The label contains an index value that identifies a next-hop address for the particular LSP. When the next-hop transit router receives the packet, it uses the index in the MPLS label to determine the next-hop address for the packet and forwards the packet to the next router in the LSP. As each packet travels through the transit network, every router along the way performs a lookup on the MPLS label and forwards the packet accordingly. When the egress router receives a packet, it examines the header to determine that it is the final router in the LSP. The egress router then removes the MPLS header, performs a regular IP route lookup, and forwards the packet with its IP header to the next-hop address.

LSRs can perform five label operations, First, a "push" operation adds a new label to the top of the packet. For IPv4 packets arriving at the inbound router, the new label is the first label in the label stack. For MPLS packets with an existing label, this operation adds a label to the stack and sets the stacking bit to 0, indicating that more MPLS labels follow the first. When the ingress router receives the packet, it performs an IP route lookup on the packet. Because the route lookup yields an LSP next hop, the ingress router performs a label push on the packet, and then forwards the packet to the LSP next hop. Second, a "swap" (or switch) operation replaces the label at the top of the label stack with a new label. When a transit router receives the packet, it performs an MPLS forwarding table lookup. The lookup yields the LSP next hop and the path index of the link between the transit router and the next router in the LSP. Third, a "pop" operation removes the label from the top of the label stack. For IPv4 packets arriving at the penultimate router, the entire MPLS label is removed from the label stack. For MPLS packets with an existing label, this operation removes the top label from the label stack and modifies the stacking bit as necessary (e.g., sets it to 1 if only a single label remains in the stack). If multiple LSPs terminate at the same outbound router, the router performs MPLS label operations for all outbound traffic on the LSPs. To share the operations among multiple routers, most LSPs use penultimate hop popping (PHP). Fourth, a "multiple push" operation adds multiple labels to the top of the label stack. This action is equivalent to performing multiple push operations. Finally, a "swap and push" operation replaces the top label with a new label and then pushes a new label to the top of the stack.

An MPLS LSP may be established either (A) statically (e.g., via manual configuration), or (B) dynamically (e.g., using a protocol such as the label distribution protocol (LDP) or the resource reservation protocol (RSVP)). Like a static route, a static LSP requires each router along the path to be configured explicitly. A network administrator must manually configure the path and its associated label values. Static LSPs require less processing by the LSRs because no signaling protocol is used. However, because paths are statically configured, they cannot adapt to network conditions. Dynamic LSPs use signaling protocols to establish themselves and propagate LSP information to other LSRs in the network. A network administrator configures the inbound router with LSP information that is transmitted throughout the network when they enable the signaling protocols across the LSRs. Because the LSRs must exchange and process signaling packets and instructions, dynamic LSPs consume more resources than static LSPs. However, dynamic LSPs can avoid the network problems by detecting topology changes and outages and propagating them throughout the network.

FIG. 1 illustrates an example of an LSP between ingress router R1 (PE1) and egress router R5 (PE2). Typically, when MPLS is deployed, penultimate hop popping ("PHP") is used instead of ultimate hop popping ("UHP"). Router CE1 forwards an Internet Protocol (IP) packet to its next hop (R1), which is also the LSP ingress (or headend). R1 checks prefix 5.5.5.5 (destination loopback) against the following information stored in its forwarding table:

```
enugadi@Enugadi# run show route 5.5.5.5
inet.0: 16 destinations, 17 routes (15 active, 0 holddown, 1 hidden)
    + = Active Route, - = Last Active, * = Both 5.5.5.5/32      *[Static/5] 01:33:28
                > to 10.0.0.2 via ge-0/0/0.10, Push 1000002
                [OSPF/10] 01:01:42, metric 5
                > to 10.0.0.2 via ge-0/0/0.10
```

R1 pushes label L1 (L1-1000002) on the packet and forwards the labeled packet (L1+IP) to router R2. R2 checks input label 1000002 against the following information stored in its MPLS forwarding table:

```
enugadi@Enugadi# run show route table mpls.0 label 1000002
                        logical-router r2
mpls.0: 6 destinations, 6 routes (6 active, 0 holddown, 0 hidden)
    + = Active Route, - = Last Active, * = Both 1000002         *[Static/5] 00:45:22
                > to 10.0.0.6 via ge-0/1/0.10, Swap 1000003
```

As a result, R2 completes the standard MPLS label swapping operation, swapping label L1 for label L2 (L2-10000003), and forwards the labeled packet (L2+IP) to router R3. R3 checks the input label 10000003 against the following information stored in its MPLS forwarding table:

```
enugadi@Enugadi# run show route table mpls.0 label 1000003 logical-
                        router r3
mpls.0: 5 destinations, 5 routes (5 active, 0 holddown, 0 hidden)
    + = Active Route, - = Last Active, * = Both 1000003         *[Static/5] 00:50:03
                > to 10.0.0.10 via ge-0/0/0.11, Swap 1000004
```

As a result, R3 completes the standard MPLS label swapping operation, swapping label L2 for label L3 (L3-10000004), and forwards the labeled packet (L3+IP) to router R4. R4 checks the input label 10000004 against the following information stored in its MPLS forwarding table:

```
enugadi@Enugadi# run show route table mpls.0 label 1000004 logical-
                        router r4
mpls.0: 6 destinations, 6 routes (6 active, 0 holddow, 0 hidden)
    + = Active Route, - = Last Active, * = Both 1000004         *[Static/5] 01:24:54
                > to 10.0.0.14 via ge-0/0/0.11, Swap 0
1000004(S = 0)  *[Static/5] 01:24:54
                > to 10.0.0.14 via ge-0/0/0.11, Pop
```

Since R4 is the penultimate-hop router for the LSP to router R5 (PE2), it first pops the label L3 and then forwards the packet (e.g., with label 0, not shown) to router R5. When R5 receives the packet, it can have a service label, an explicit-null label, or just be a plain IP or VPLS packet. R5 then forwards the unlabeled packet to router CE2.

In summary, with the static LSP, R1 reaches R5 through MPLS labeling which is indicated by traceroute result below:

```
enugadi@Enugadi# run traceroute 5.5.5.5
traceroute to 5.5.5.5 (5.5.5.5), 30 hops max, 40 byte packets 1    10.0.0.2 (10.0.0.2) 0.172 ms 0.118 ms 0.109 ms
     MPLS Label = 1000002 CoS = 0 TTL = 1 S = 1
```

-continued

```
enugadi@Enugadi# run traceroute 5.5.5.5
traceroute to 5.5.5.5 (5.5.5.5), 30 hops max, 40 byte packets
  2    10.0.0.6 (10.0.0.6) 0.204 ms 0.194 ms 0.192 ms
       MPLS Label = 1000003 CoS = 0 TTL = 1 S = 1
  3    10.0.0.10 (10.0.0.10) 0.288 ms 0.283 ms 0.280 ms
       MPLS Label = 1000004 CoS = 0 TTL = 1 S = 1
  4    5.5.5.5 (5.5.5.5) 0.336 ms 0.332 ms 0.336 ms
```

§ 1.2.2 Fast Reroute (FRR)

Fast reroute (FRR) provides redundancy for an LSP path. When fast reroute is enabled, detours for data traffic are precomputed and preestablished along the LSP. If a network failure occurs on the current LSP path, traffic is quickly rerouted to one of the detours. Each detour is established by an upstream node to avoid the link toward the immediate downstream node and the immediate downstream node itself. Each detour might traverse through one or more label-switched routers (or switches).

Fast reroute protects traffic against any single point of failure between the ingress and egress routers (or switches). If, however, there are multiple failures along an LSP, fast reroute itself might fail. Further, fast reroute does not protect against failure of the ingress or egress routers.

If a node detects that a downstream link has failed (using a link-layer-specific liveness detection mechanism) or that a downstream node has failed (for example, using the RSVP neighbor hello protocol), the node quickly switches the traffic to the detour and, at the same time, signals the ingress router about the link or node failure Note that after the node switches traffic to the detour, it might switch the traffic again to a newly calculated detour soon after. This is because the initial detour route might not be the best route. To make rerouting as fast as possible, the node switches traffic onto the initial detour without first verifying that the detour is valid. Once the switch is made, the node recomputes the detour. If the node determines that the initial detour is still valid, traffic continues to flow over this detour. If the node determines that the initial detour is no longer valid, it again switches the traffic to a newly computed detour.

The time required for a fast-rerouting detour to take effect depends on two independent time intervals: (1) the amount of time to detect that there is a link or node failure; and (2) the amount of time required to splice the traffic onto the detour. The amount of time to detect that there is a link or node failure depends greatly on the link layer in use and the nature of the failure. Splicing the traffic onto the detour is typically performed by a packet forwarding engine (PFE) component of a router, and the amount of time required to splice the traffic onto the detour can vary depending on the number of LSPs being switched to detours.

As should be appreciated from the foregoing, fast reroute can be thought of as a short-term patch to reduce packet loss. Since, however, detour computation might not reserve adequate bandwidth, the detours might introduce congestion on the alternate links. Since the ingress router might be the only router that is fully aware of LSP policy constraints, it is best able to come up with adequate long-term alternate paths.

To reduce network overhead further, each detour attempts to merge back into the original LSP as soon as possible after the failed node or link.

The document, P. Pan, et al., "Fast Reroute Extensions to RSVP-TE for LSP Tunnels," *Request for Comments* 4090 (Internet Engineering Task Force, May 2005) (referred to as "RFC 4090" and incorporated herein by reference) discusses RSVP-TE extensions to establish backup label-switched path (LSP) tunnels for local repair of LSP tunnels. The document, M. Shand, et al, "IP Fast Reroute Framework," *Request for Comments* 5714 (Internet Engineering Task Force, January 2010) (referred to as "RFC 5714" and incorporated herein by reference), discusses a framework for the development of IP fast-reroute mechanisms that provide protection against link or router failure by invoking locally determined repair paths.

§ 1.2.2.1 Use of Loop-Free Alternative (LSA) Routes with FRR

Some routers (such as some from Juniper Networks, Inc. of Sunnyvale, Calif.) precompute loop-free backup routes (also referred to as loop-free alternative (LFA) routes), which may be used with FRR. These backup routes may be preinstalled in the Packet Forwarding Engine (PFE) of a router, which performs a local repair and implements the backup path when the link for a primary next hop for a particular route is no longer available. With local repair, the Packet Forwarding Engine can correct a path failure before it receives recomputed paths from the Routing Engine of the router. Local repair reduces the amount of time needed to reroute traffic. In contrast, global repair can take up much longer (e.g., up to 800 milliseconds) to compute a new route. Local repair and global repair are thus complementary. More specifically, local repair enables traffic to continue to be routed using a backup path until global repair is able to calculate a new route.

A "loop-free" path is one that does not forward traffic back through the routing device to reach a given destination. That is, a neighbor whose shortest path to the destination traverses the routing device is not used as a backup route to that destination. Some routers run shortest-path-first (SPF) calculations on each one-hop neighbor routers to determine loop-free alternate (LFA) paths for certain routes.

The level of backup coverage available through intermediate system-intermediate system (IS-IS) routes depends on the actual network topology and is typically less than 100 percent for all destinations on any given routing device. Backup coverage can be extended (e.g., to include RSVP LSPs).

Some routers provide two mechanisms for route redundancy using alternate loop-free routes: (1) link protection and (2) node-link protection. When link protection or node-link protection is enabled on an interface, a single alternate path to the primary next hop is created for all destination routes that traverse a protected interface. Link protection offers per-link traffic protection. Link protection is appropriate when it is assumed that only a single link might become unavailable but that the neighboring node on the primary path would still be available through another interface. Node-link protection establishes an alternate path through a different routing device altogether. Node-link protection is most appropriate when it is assumed that access to a node is lost when a link is no longer available. As a result, a backup path that avoids the primary next-hop routing device is determined.

Typically, link protection can be configured on an interface. When link protection is enabled, one alternate path to the primary next hop may be determined for all destination routes that traverse a protected interface. Link protection assumes that only a single link becomes unavailable, but that the neighboring node would still be available through another interface.

Node-link protection can be configured on an interface. Node-link protection establishes an alternate path through a different routing device altogether for all destination routes that traverse a protected interface. Node-link protection assumes that the entire routing device, or node, on the next hop has failed. Thus, the determined backup path avoids the primary next-hop routing device.

The document, A. Atlas, et al., "Basic Specification for IP Fast Reroute: Loop-Free Alternates," *Request for Comments* 5286 (Internet Engineering Task Force, September 2008) (referred to as "RFC 5286" and incorporated herein by reference) describes the use of loop-free alternates to provide local protection for unicast traffic in pure IP and MPLS/LDP networks in the event of a single failure, whether link, node, or shared risk link group (SRLG). The document, S. Bryant, et al., "Remote Loop-Free Alternate (LFA) Fast Reroute (FRR)," *Request for Comments* 7490 (Internet Engineering Task Force, April 2015) (referred to as "RFC 7490" and incorporated herein by reference) extends the LFA approach described in RFC 5286 to cover some topologies that are not well protected by LFAs alone. It does so by tunneling the packets that require IPFRR to a node that is both reachable from a point of local repair and can reach the destination. Finally, the document, S. Litkowski, et al., "Topology Independent Fast Reroute using Segment Routing," *draft-ietf-rtgwg-segment-routing-ti-lfa*-01 (Internet Engineering Task Force, Mar. 5, 2019) (referred to as "the TI-LFA draft" and incorporated herein by reference) discusses relying on segment routing (SR) to provide a local repair mechanism for standard interior gateway protocol (IGP) shortest path capable of restoring end-to-end connectivity in the case of a sudden directly connected failure of a network component.

§ 1.2.2.2 Limitations of FRR

As described above, FRR is used to react to link and/or node failures in a communications network. It does not, however, consider problems that occur when a link (or node) becomes congested. Congestion on IP networks may occur for a number of reasons such as, for example, (1) unpredictable and unplanned burst of ingress traffic that may be short or long lived, (2) failure of one or more constituent links that connect two nodes, (3) failure of a link in another path or the network resulting in global re-optimization, etc.

Network operators often view bandwidth or resource management as a tactical exercise, rather than a strategic planning exercise in which full or partial meshes of bandwidth aware traffic-engineered LSPs are deployed. Some have perceived strategic resource management as being complex due to upfront planning and quiescent state maintenance required in the network.

For example, human-driven tactical TE solutions have been around since the inception of explicit routing. Workflows of such human-driven tactical TE solutions typically include the following steps. First, an entity notices the congestion (via, e.g., a customer trouble call, SNMP monitoring system notification, etc.). Second, a human verifies the situation by examining the routers along a given path or paths within the network. Third, a modeling tool is used to run a traffic simulation. Fourth, an explicit path is identified. Fifth, a human or script is used to provision the explicit path in the network, and some set of traffic is statically routed onto the explicit path. Sixth, the state of congestion is then monitored. These steps, one through six, may be repeated if congestion continues. Further, these steps may ultimately be reversed once the congestion situation has been cleared. Unfortunately, these steps can take quite some time and are error prone (especially since a human is involved in multiple stages, which can often lead to incorrect decisions).

§ 2. SUMMARY OF THE INVENTION

As should be appreciated from the foregoing, there is a desire for a tactical solution that removes and/or eases any upfront planning and preferably minimizes sedentary network state. In such a solution, it would be desirable for the network to detect data-plane congestion along the shortest-path(s) between two (e.g., ingress and egress) nodes. Then, once congestion is detected, such a solution should react by moving traffic away from the congested link or links. It would also be desirable to continuously monitor the state of congestion so that traffic can be moved back to the shortest-path once the congestion event subsides or ends.

Example embodiments consistent with the present description may be provide such a tactical solution to network congestion by providing a method for use by a data forwarding device having (1) a first interface with a first link to a downstream data forwarding device and (2) second interface with a second link to a downstream data forwarding device, the method comprising: (a) configuring the second interface as part of a loop-free alternate (LFA) path to a destination device, wherein the first interface is part of a shortest/preferred path to the destination device; (b) monitoring congestion at the first interface to determine whether or not the congestion exceeds a first threshold; and (c) responsive to a determination that the congestion exceeds the first threshold, forwarding at least some data addressed to the destination device, over the LFA path via the second interface instead of over the shortest/preferred path via the first interface, thereby alleviating congestion at the first interface, and otherwise, responsive to a determination that the congestion does not exceed the first threshold, not forwarding at least some data addressed to the destination device, over the LFA path via the second interface instead of over the shortest/preferred path via the first interface.

Responsive to a determination that the congestion exceeds the first threshold, in addition to forwarding at least some data addressed to the destination device, over the LFA path via the second interface instead of over the shortest/preferred path via the first interface, thereby alleviating congestion at the first interface, at least some example methods may further (d) monitor a sum of (1) congestion at the first interface and (2) congestion at the second interface, to define collective congestion; (e) determine whether or not the collective congestion fall below a second threshold; and (f) responsive to a determination that the collective congestion falls below the second threshold, redirecting at least some data addressed to the destination device from the LFA path via the second interface to the preferred/shortest path via the first interface, and otherwise, responsive to a determination that the collective congestion does not fall below the second threshold, continuing to forward at least some data addressed to the destination device, over the LFA path via the second interface instead of over the shortest/preferred path via the first interface. In some such example methods, the second threshold is the same as the threshold, while in other such example methods, the second threshold is different from the threshold.

In some example methods, the LFA path is a remote LFA path. In some other example methods, the LFA path is a topology independent LFA path.

In some example methods, the data forwarding device belongs to a network domain employing segment routing (SR), and the LFA path is defined using strict segment identifier (SSID).

In some example methods, the first link has a lower cost metric than that of the second link.

In some example methods, the LFA path is defined by strict shortest path first (SSPF) segment identifiers (SIDs).

§ 3. BRIEF DESCRIPTION OF THE DRAWINGS

§ 4. DETAILED DESCRIPTION

The present description may involve novel methods, apparatus, message formats, and/or data structures for providing tactical traffic engineering solutions to network congestion. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 EXAMPLE METHODS

Figure 1:
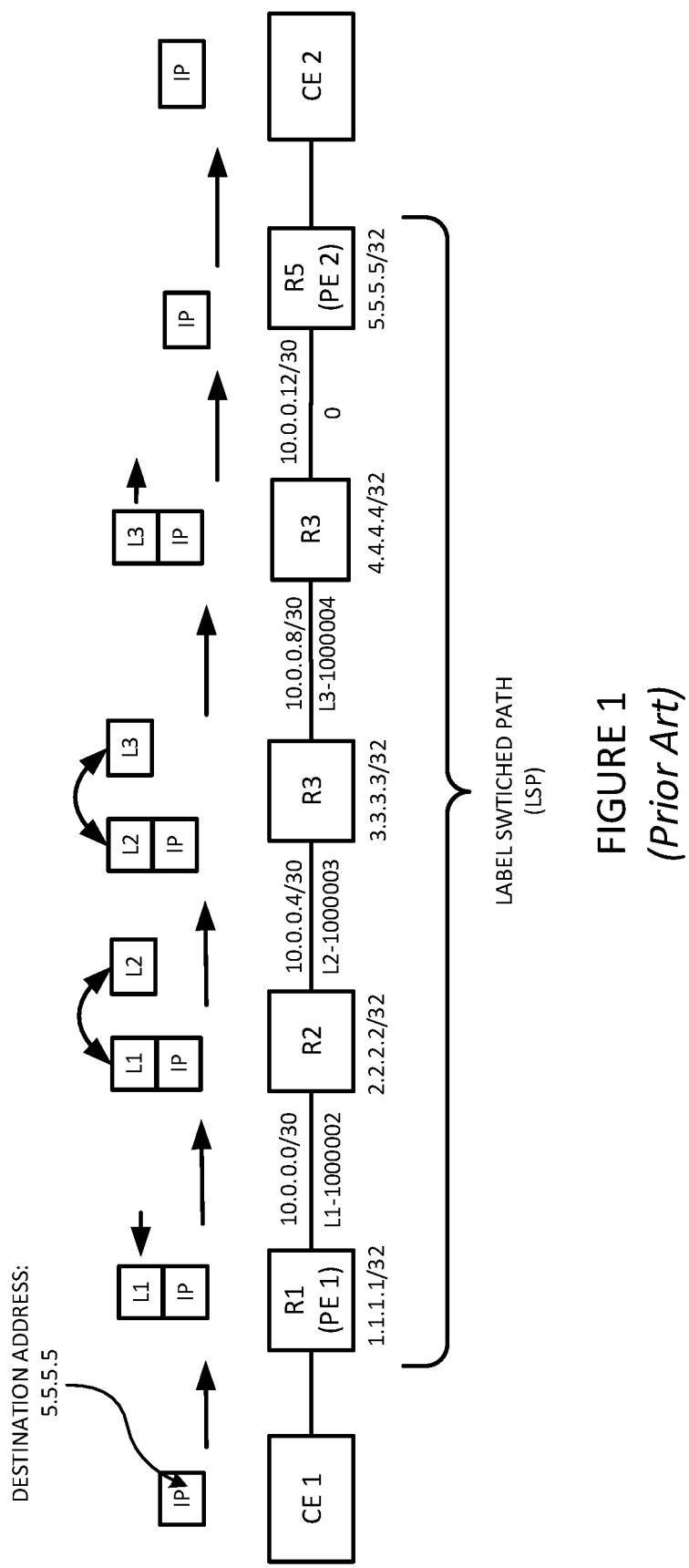
FIG. 1 illustrates an example of an LSP between an ingress router and an egress router.
Figure 2:
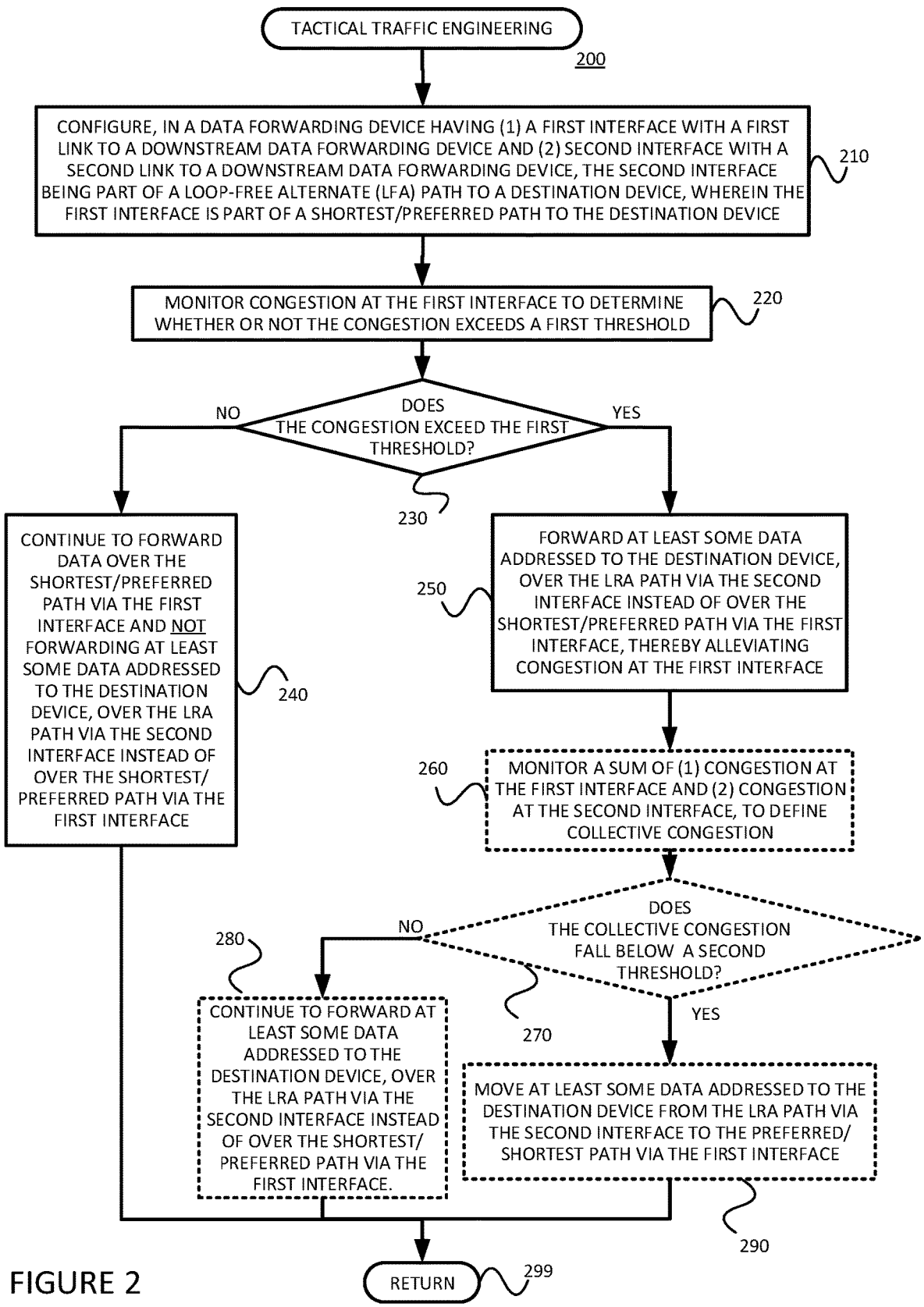
FIG. 2 is a flow diagram of an example method for providing a tactical traffic engineering solution to network congestion.

FIG. 2 is a flow diagram of an example method 200 for providing a tactical traffic engineering solution to network congestion. The example method 200 may be performed by a data forwarding device having (1) a first interface with a first link to a downstream data forwarding device, wherein the first interface is part of a shortest/preferred path to the destination device, and (2) second interface with a second link to a downstream data forwarding device. As shown, the second interface is configured as part of a loop-free alternate (LFA) path to the destination device. (Block 210) Congestion at the first interface is monitored to determine whether or not the congestion exceeds a first threshold. (Block 220 and Decision Block 230) Responsive to a determination that the congestion exceeds the first threshold (Decision Block 230, YES), at least some data addressed to the destination device is forwarded over the LFA path via the second interface instead of over the shortest/preferred path via the first interface, thereby alleviating congestion at the first interface. (Block 250) That is, at least some of the data addressed to the destination address is diverted from the first interface to the second interface. Otherwise, responsive to a determination that the congestion does not exceed the first threshold (Decision Block 230, NO), the data remains on the shortest/preferred path via the first interface (at least some data addressed to the destination device is not diverted for forwarding over the LFA path via the second interface; it remains for forwarding over the first interface). (Block 240) The example method 200 is then left. (Node 299)

Referring back to the right branch of the example method 200, responsive to a determination that the congestion exceeds the first threshold (Decision block 230, YES), in addition to forwarding at least some data addressed to the destination device over the LFA path via the second interface instead of over the shortest/preferred path via the first interface, thereby alleviating congestion at the first interface (Recall block 250), the example method 200 may further monitor a sum of (1) congestion at the first interface and (2) congestion at the second interface, to define collective congestion (Block 260), and determine whether or not the collective congestion falls below a second threshold (Decision Block 270). Responsive to a determination that the collective congestion falls below the second threshold (Decision Block 270, YES), at least some data addressed to the destination device is moved (e.g., redirected, diverted, etc.) from the LFA path via the second interface back to the preferred/shortest path via the first interface. (Block 290) The example method 200 is then left. (Node 299) Otherwise, responsive to a determination that the collective congestion does not fall below the second threshold (Decision Block 270, NO), the example method 200 continues forwarding at least some data addressed to the destination device, over the LFA path via the second interface instead of over the shortest/preferred path via the first interface. (Block 280) The example method 200 is then left. (Node 299)

Referring back to decision block 270, in at least some example methods 200, the second threshold is the same as the threshold. However, this is not necessary, and in other example methods 200, the second threshold is different from the threshold. The threshold(s) may be defined as some percentage of the link's total capacity (e.g., 95% of link bandwidth).

In some example methods 200, the LFA path is a remote LFA (R-LFA) path. In some other example methods 200, the LFA path is a topology independent LFA (TI-LFA) path. Such example methods using TI-LFA path(s) are preferred since they provide 100% coverage, while LFA path(s) might not.

The example method 200 may be performed by a data forwarding device in which the first link has a lower cost metric than that of the second link.

§ 4.2 EXAMPLE APPARATUS

Figure 3:
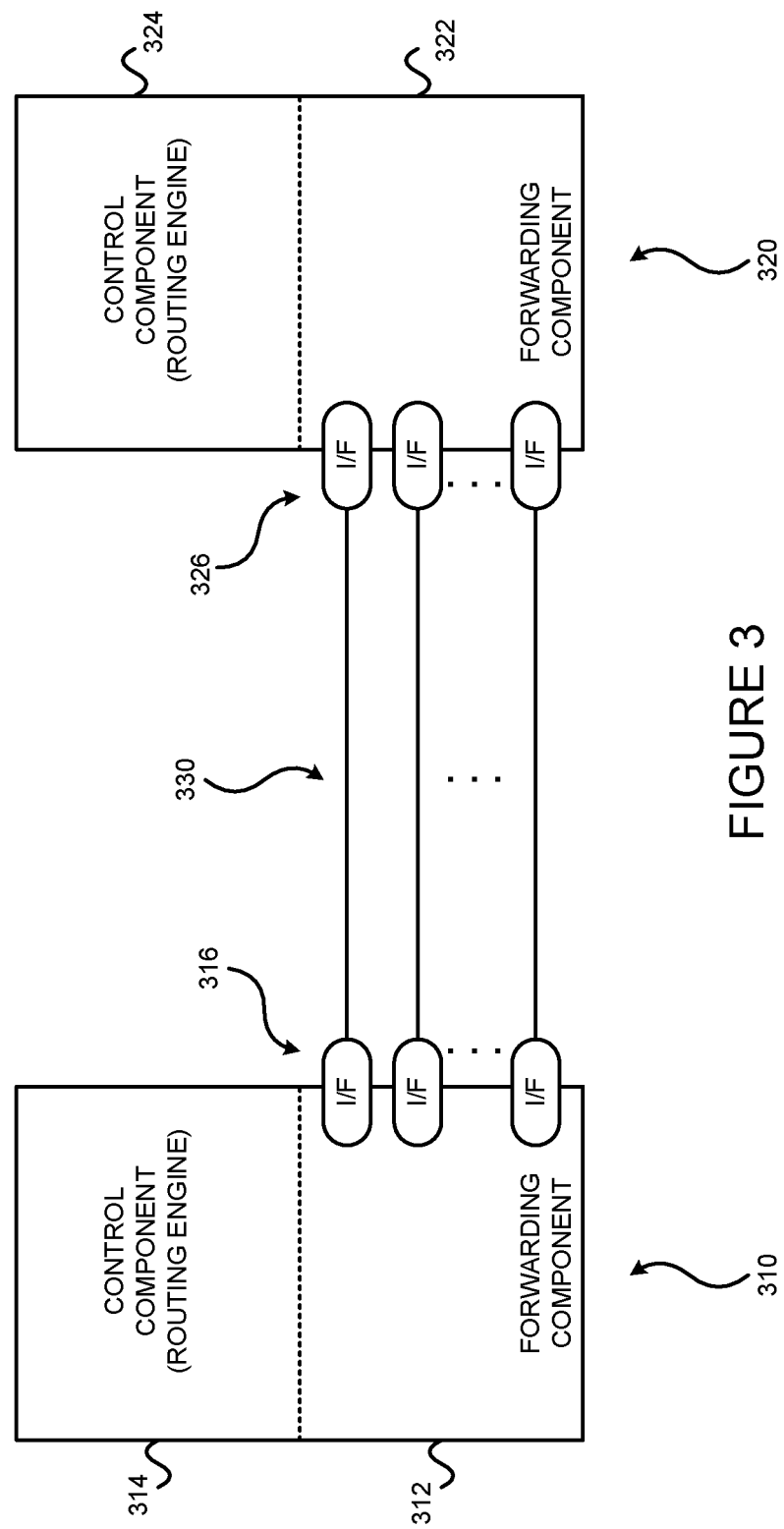
FIG. 3 illustrates an example environment including two systems coupled via communications links.

FIG. 3 illustrates two data forwarding systems 310 and 320 coupled via communications links 330. The links may be physical links or "wireless" links. The data forwarding systems 310,320 may be routers for example. If the data forwarding systems 310,320 are example routers, each may include a control component (e.g., a routing engine) 314,324 and a forwarding component 312,322. Each data forwarding system 310,320 includes one or more interfaces 316,326 that terminate one or more communications links 330.

As just discussed above, and referring to FIG. 4, some example routers 400 include a control component (e.g., routing engine) 410 and a packet forwarding component (e.g., a packet forwarding engine) 490.

The control component 410 may include an operating system (OS) kernel 420, routing protocol process(es) 430, label-based forwarding protocol process(es) 440, interface process(es) 450, user interface (e.g., command line interface) process(es) 460, and chassis process(es) 470, and may store routing table(s) 439, label forwarding information 445, and forwarding (e.g., route-based and/or label-based) table(s) 480. As shown, the routing protocol process(es) 430 may support routing protocols such as the routing information protocol ("RIP") 431, the intermediate system-to-intermediate system protocol ("IS-IS") 432, the open shortest path first protocol ("OSPF") 433, the enhanced interior gateway routing protocol ("EIGRP") 434 and the boarder gateway protocol ("BGP") 435, and the label-based forwarding protocol process(es) 440 may support protocols such as BGP 435, the label distribution protocol ("LDP") 436 and the resource reservation protocol ("RSVP") 437. One or more components (not shown) may permit a user 465 to interact with the user interface process(es) 460. Similarly, one or more components (not shown) may permit an outside device to interact with one or more of the router protocol process(es) 430, the label-based forwarding protocol process(es) 440, the interface process(es) 450, and the chassis process(es) 470, via SNMP 485, and such processes may send information to an outside device via SNMP 485.

The packet forwarding component 490 may include a microkernel 492, interface process(es) 493, distributed ASICs 494, chassis process(es) 495 and forwarding (e.g., route-based and/or label-based) table(s) 496.

Figure 4:
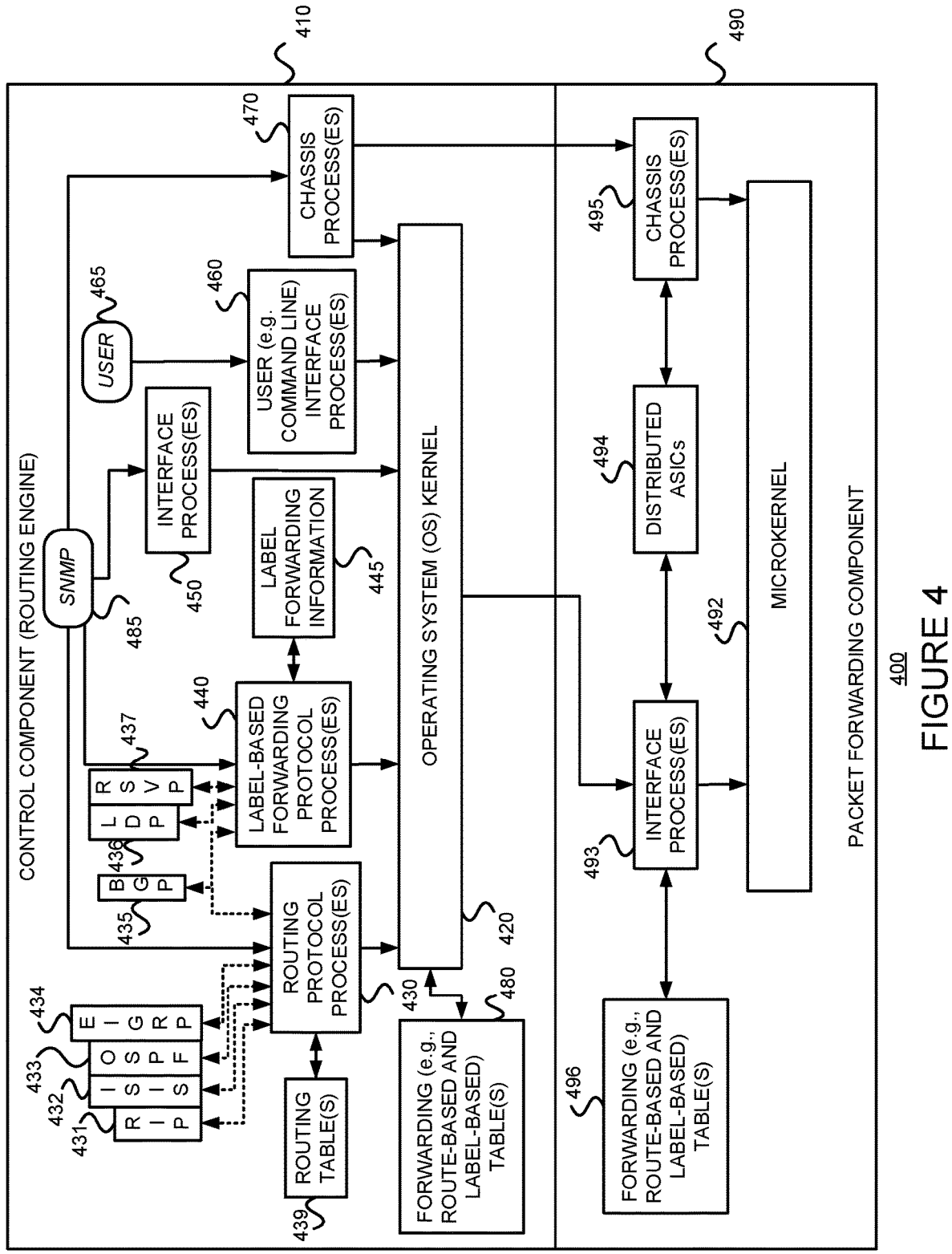
FIG. 4 is a block diagram of an example router on which one or more aspects of the present disclosure may be implemented.

In the example router 400 of FIG. 4, the control component 410 handles tasks such as performing routing protocols, performing label-based forwarding protocols, control packet processing, etc., which frees the packet forwarding component 490 to forward received packets quickly. That is, received control packets (e.g., routing protocol packets and/or label-based forwarding protocol packets) are not fully processed on the packet forwarding component 490 itself, but are passed to the control component 410, thereby reducing the amount of work that the packet forwarding component 490 has to do and freeing it to process packets to be forwarded efficiently. Thus, the control component 410 is primarily responsible for running routing protocols and/or label-based forwarding protocols, maintaining the routing tables and/or label forwarding information, sending forwarding table updates to the packet forwarding component 490, and performing system management. The example control component 410 may handle routing protocol packets, provide a management interface, provide configuration management, perform accounting, and provide alarms. The processes 430, 440, 450, 460 and 470 may be modular, and may interact with the OS kernel 420. That is, nearly all of the processes communicate directly with the OS kernel 420. Using modular software that cleanly separates processes from each other isolates problems of a given process so that such problems do not impact other processes that may be running. Additionally, using modular software facilitates easier scaling.

Still referring to FIG. 4, the example OS kernel 420 may incorporate an application programming interface ("API") system for external program calls and scripting capabilities. The control component 410 may be based on an Intel PCI platform running the OS from flash memory, with an alternate copy stored on the router's hard disk. The OS kernel 420 is layered on the Intel PCI platform and establishes communication between the Intel PCI platform and processes of the control component 410. The OS kernel 420 also ensures that the forwarding tables 496 in use by the packet forwarding component 490 are in sync with those 480 in the control component 410. Thus, in addition to providing the underlying infrastructure to control component 410 software processes, the OS kernel 420 also provides a link between the control component 410 and the packet forwarding component 490.

Referring to the routing protocol process(es) 430 of FIG. 4, this process(es) 430 provides routing and routing control functions within the platform. In this example, the RIP 431, ISIS 432, OSPF 433 and EIGRP 434 (and BGP 435) protocols are provided. Naturally, other routing protocols (e.g., PIM, PIM-SM, etc.) may be provided in addition, or alternatively. Similarly, the label-based forwarding protocol process(es) 440 provides label forwarding and label control functions. In this example, the LDP 436 and RSVP 437 (and BGP 435) protocols are provided. Naturally, other label-based forwarding protocols (e.g., MPLS) may be provided in addition, or alternatively. In the example router 400, the routing table(s) 439 is produced by the routing protocol process(es) 430, while the label forwarding information 445 is produced by the label-based forwarding protocol process(es) 440.

Still referring to FIG. 4, the interface process(es) 450 performs configuration of the physical interfaces (Recall, e.g., 316 and 326 of FIG. 3.) and encapsulation.

The example control component 410 may provide several ways to manage the router. For example, it 410 may provide a user interface process(es) 460 which allows a system operator 465 to interact with the system through configuration, modifications, and monitoring. The SNMP 485 allows SNMP-capable systems to communicate with the router platform. This also allows the platform to provide necessary SNMP information to external agents. For example, the SNMP 485 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 410, thereby avoiding slowing traffic forwarding by the packet forwarding component 490.

Although not shown, the example router 400 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 460 via a console port, an auxiliary port, and/or a management Ethernet port The packet forwarding component 490 is responsible for properly outputting received packets as quickly as possible. If there is no entry in the forwarding table for a given destination or a given label and the packet forwarding component 490 cannot perform forwarding by itself, it 490 may send the packets bound for that unknown destination off to the control component 410 for processing. The example packet forwarding component 490 is designed to perform Layer 2 and Layer 3 switching, route lookups, and rapid packet forwarding.

As shown in FIG. 4, the example packet forwarding component 490 has an embedded microkernel 492, interface process(es) 493, distributed ASICs 494, and chassis process(es) 495, and stores a forwarding (e.g., route-based and/or label-based) table(s) 496. The microkernel 492 interacts with the interface process(es) 493 and the chassis process(es) 495 to monitor and control these functions. The interface process(es) 492 has direct communication with the OS kernel 420 of the control component 410. This communication includes forwarding exception packets and control packets to the control component 410, receiving packets to be forwarded, receiving forwarding table updates, providing information about the health of the packet forwarding component 490 to the control component 410, and permitting configuration of the interfaces from the user interface (e.g., CLI) process(es) 460 of the control component 410. The stored forwarding table(s) 496 is static until a new one is received from the control component 410. The interface process(es) 493 uses the forwarding table(s) 496 to look up next-hop information. The interface process(es) 493 also has direct communication with the distributed ASICs 494. Finally, the chassis process(es) 495 may communicate directly with the microkernel 492 and with the distributed ASICs 494.

In the example router 400, the example method 200 consistent with the present disclosure may be implemented in the user interface process(es) 450 in the control component 410, and/or in the interface process(es) 493 of the packet forwarding component (e.g., a packet forwarding engine). For example, the LFA route and first and second thresholds may be configured via a user command line interface process(es) 460 or via the user interface process(es) 450 and installed on the forwarding tables 480/496. Congestion on the interface(s) may be monitored by interface process(es) 493.

Figure 5:
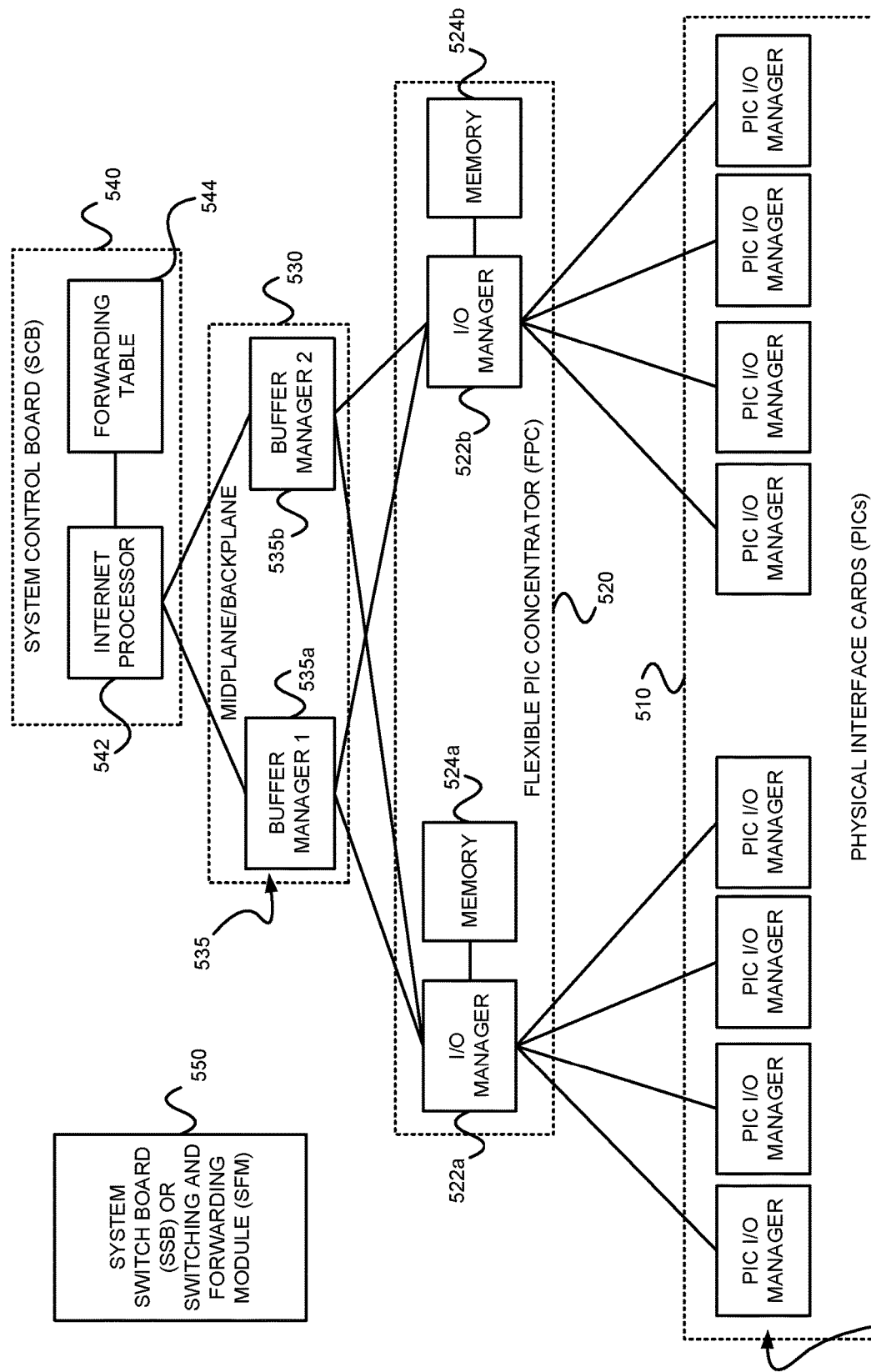
FIG. 5 is a block diagram of example distributed application specific integrated circuits ("ASICs") that may be provided in the example router of FIG. 4.

Referring back to distributed ASICs 494 of FIG. 4, FIG. 5 is an example of how the ASICS may be distributed in the packet forwarding component 490 to divide the responsibility of packet forwarding. As shown in FIG. 5, the ASICs of the packet forwarding component 490 may be distributed on physical interface cards ("PICs") 510, flexible PIC concentrators ("FPCs") 520, a midplane or backplane 530, and a system control board(s) 540 (for switching and/or forwarding). Switching fabric is also shown as a system switch board ("SSB"), or a switching and forwarding module ("SFM") 550. Each of the PICs 510 includes one or more PIC I/O managers 515. Each of the FPCs 520 includes one or more I/O managers 522, each with an associated memory 524. The midplane/backplane 530 includes buffer managers 535*a*, 535*b*. Finally, the system control board 540 includes an internet processor 542 and an instance of the forwarding table 544 (Recall, e.g., 496 of FIG. 4).

Still referring to FIG. 5, the PICs 510 contain the interface ports. Each PIC 510 may be plugged into an FPC 520. Each individual PIC 510 may contain an ASIC that handles media-specific functions, such as framing or encapsulation. Some example PICs 510 provide SDH/SONET, ATM, Gigabit Ethernet, Fast Ethernet, and/or DS3/E3 interface ports.

An FPC 520 can contain from one or more PICs 510, and may carry the signals from the PICs 510 to the midplane/backplane 530 as shown in FIG. 5.

The midplane/backplane 530 holds the line cards. The line cards may connect into the midplane/backplane 530 when inserted into the example router's chassis from the front. The control component (e.g., routing engine) 410 may plug into the rear of the midplane/backplane 530 from the rear of the chassis. The midplane/backplane 530 may carry electrical (or optical) signals and power to each line card and to the control component 410.

The system control board 540 may perform forwarding lookup. It 540 may also communicate errors to the routing engine. Further, it 540 may also monitor the condition of the router based on information it receives from sensors. If an abnormal condition is detected, the system control board 540 may immediately notify the control component 410.

Figure 6A:
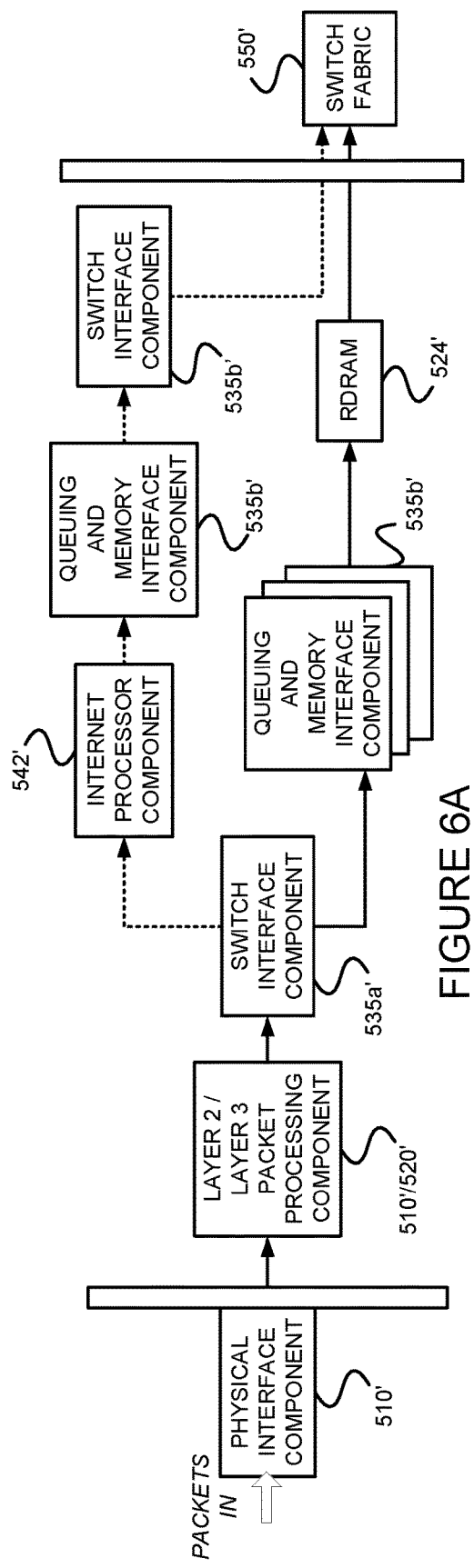
FIGS. 6A and 6B illustrate example packet forwarding operations of the example distributed ASICs of FIG. 5.
Figure 6B:
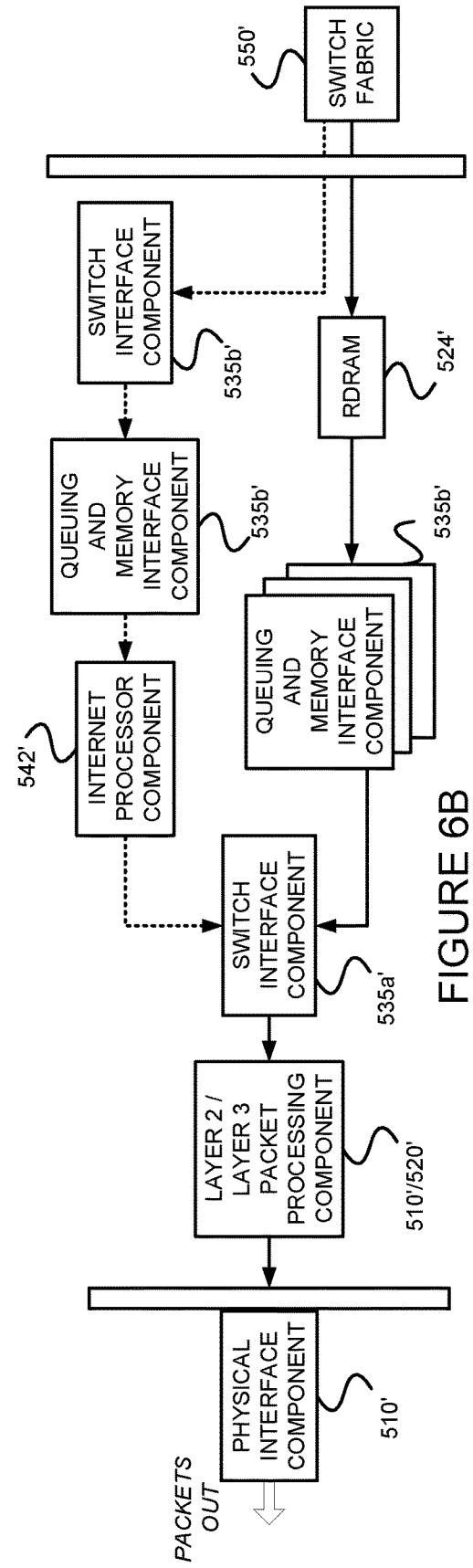

Referring to FIGS. 5, 6A and 6B, in some exemplary routers, each of the PICs 510,410' contains at least one I/O manager ASIC 515 responsible for media-specific tasks, such as encapsulation. The packets pass through these I/O ASICs on their way into and out of the router. The I/O manager ASIC 515 on the PIC 510,410' is responsible for managing the connection to the I/O manager ASIC 522 on the FPC 520,420', managing link-layer framing and creating the bit stream, performing cyclical redundancy checks (CRCs), and detecting link-layer errors and generating alarms, when appropriate. The FPC 520 includes another I/O manager ASIC 522. This ASIC 522 takes the packets from the PICs 510 and breaks them into (e.g., 64-byte) memory blocks. This FPC I/O manager ASIC 522 sends the blocks to a first distributed buffer manager (DBM) 535*a*', decoding encapsulation and protocol-specific information, counting packets and bytes for each logical circuit, verifying packet integrity, and applying class of service (CoS) rules to packets. At this point, the packet is first written to memory. More specifically, the example DBM ASIC 535*a*' manages and writes packets to the shared memory 524 across all FPCs 520. In parallel, the first DBM ASIC 535*a*' also extracts information on the destination of the packet and passes this forwarding-related information to the Internet processor 542/442'. The Internet processor 542/442' performs the route lookup using the forwarding table 544 and sends the information over to a second DBM ASIC 535*b*'. The Internet processor ASIC 542/442' also collects exception packets (i.e., those without a forwarding table entry) and sends them to the control component 410. The second DBM ASIC 535*b*' then takes this information and the 64-byte blocks and forwards them to the I/O manager ASIC 522 of the egress FPC 520/420' (or multiple egress FPCs, in the case of multicast) for reassembly. (Thus, the DBM ASICs 535*a*' and 535*b*' are responsible for managing the packet memory 524 distributed across all FPCs 520/420', extracting forwarding-related information from packets, and instructing the FPC where to forward packets.)

The I/O manager ASIC 522 on the egress FPC 520/420' may perform some value-added services. In addition to incrementing time to live ("TTL") values and re-encapsulating the packet for handling by the PIC 510, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 522 on the egress FPC 520/420' may be responsible for receiving the blocks from the second DBM ASIC 535b', incrementing TTL values, queuing a pointer to the packet, if necessary, before applying CoS rules, re-encapsulating the blocks, and sending the encapsulated packets to the PIC I/O manager ASIC 515.

Figure 7:
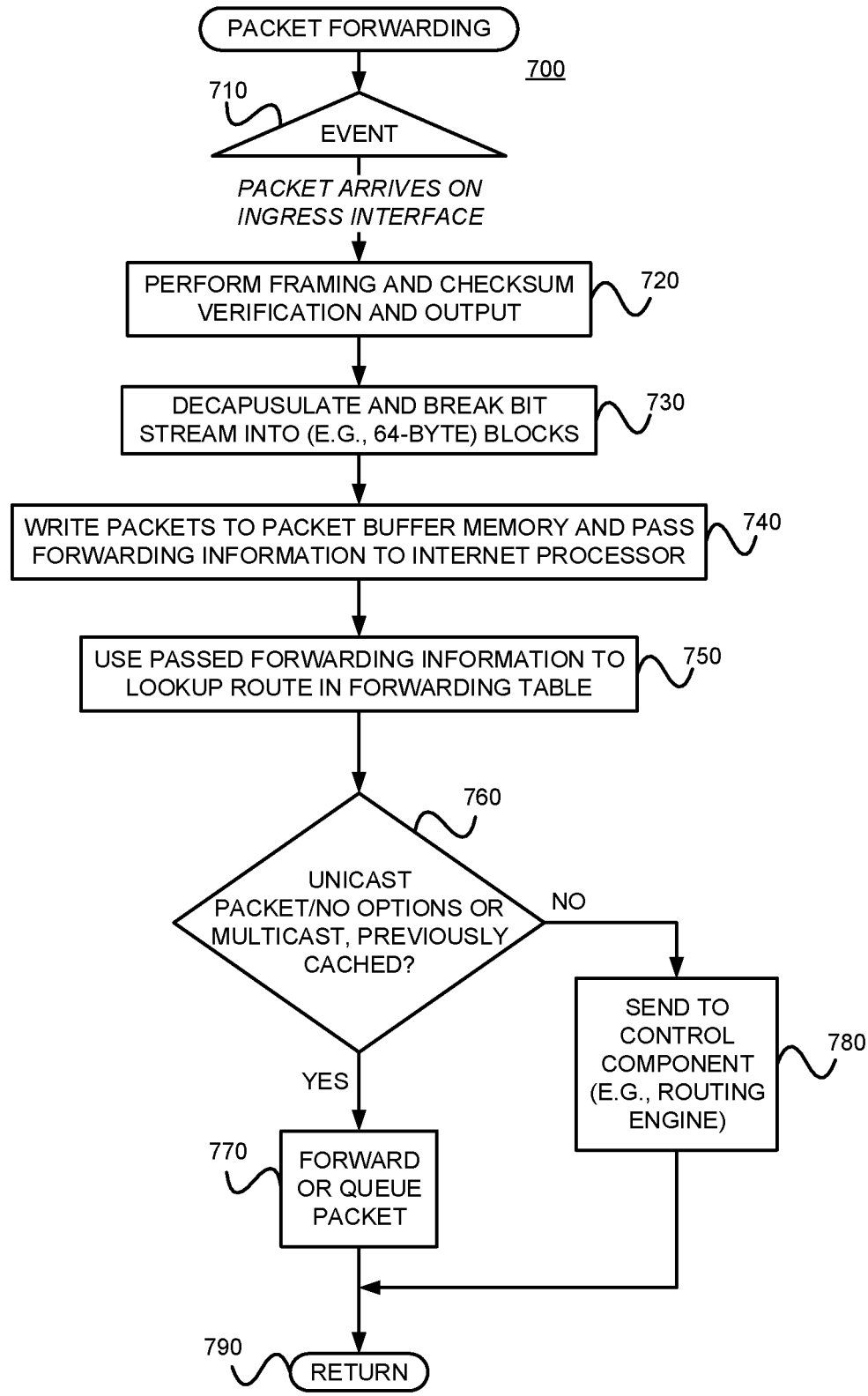
FIG. 7 is a flow diagram of an example packet forwarding method that may be implemented on any of the example routers of FIGS. 5 and 6.

FIG. 7 is a flow diagram of an example method 700 for providing packet forwarding in the example router. The main acts of the method 700 are triggered when a packet is received on an ingress (incoming) port or interface. (Event 710) The types of checksum and frame checks that are required by the type of medium it serves are performed and the packet is output, as a serial bit stream. (Block 720) The packet is then decapsulated and parsed into (e.g., 64-byte) blocks. (Block 730) The packets are written to buffer memory and the forwarding information is passed on the Internet processor. (Block 740) The passed forwarding information is then used to lookup a route in the forwarding table. (Block 750) Note that the forwarding table can typically handle unicast packets that do not have options (e.g., accounting) set, and multicast packets for which it already has a cached entry. Thus, if it is determined that these conditions are met (YES branch of Decision 760), the packet forwarding component finds the next hop and egress interface, and the packet is forwarded (or queued for forwarding) to the next hop via the egress interface (Block 770) before the method 700 is left (Node 790) Otherwise, if these conditions are not met (NO branch of Decision 760), the forwarding information is sent to the control component 410 for advanced forwarding resolution (Block 780) before the method 700 is left (Node 790).

Referring back to block 770, the packet may be queued. Actually, as stated earlier with reference to FIG. 5, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 522 may send a request for the packet to the second DBM ASIC 535b. The DBM ASIC 535 reads the blocks from shared memory and sends them to the I/O manager ASIC 522 on the FPC 520, which then serializes the bits and sends them to the media-specific ASIC of the egress interface. The I/O manager ASIC 515 on the egress PIC 510 may apply the physical-layer framing, perform the CRC, and send the bit stream out over the link.

Referring back to block 780 of FIG. 7, as well as FIG. 5, regarding the transfer of control and exception packets, the system control board 540 handles nearly all exception packets. For example, the system control board 540 may pass exception packets to the control component 410.

Although example embodiments consistent with the present disclosure may be implemented on the example routers of FIG. 3 or 4, embodiments consistent with the present disclosure may be implemented on communications network nodes (e.g., routers, switches, etc.) having different architectures. More generally, embodiments consistent with the present disclosure may be implemented on an example system 800 as illustrated on FIG. 8.

Figure 8:
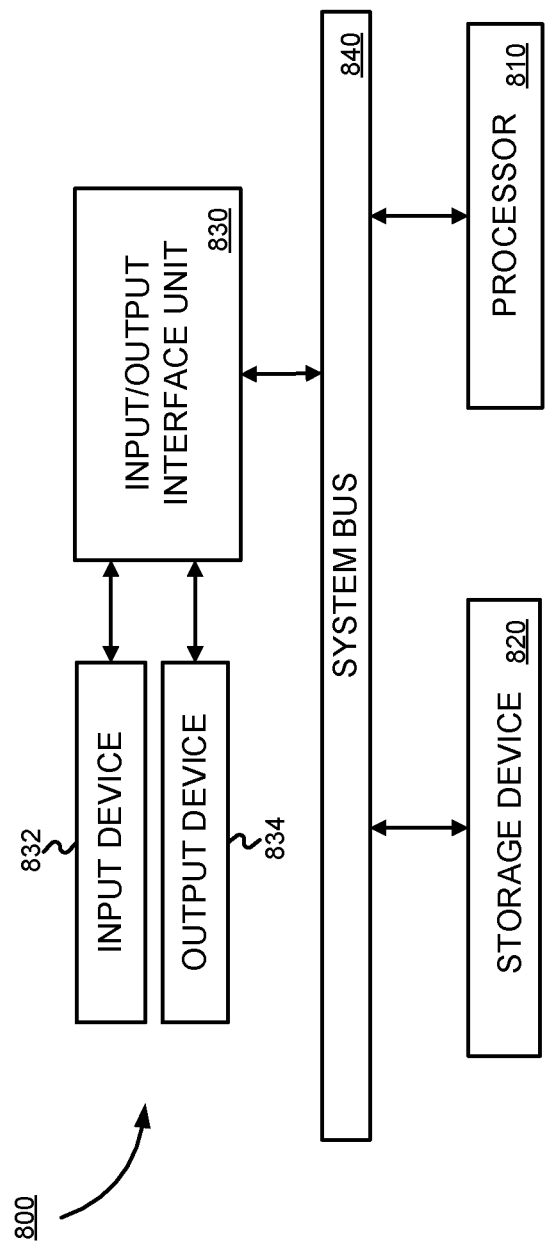
FIG. 8 is a block diagram of an example processor-based system that may be used to execute the example methods described, and/or to store information used and/or generated by such example methods.

FIG. 8 is a block diagram of an exemplary machine 800 that may perform one or more of the methods described, and/or store information used and/or generated by such methods. The exemplary machine 800 includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830. The one or more processors 810 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 820 and/or may be received from an external source via one or more input interface units 830. The machine executable instructions may be stored as various software modules, each module performing one or more operations. Functional software modules are examples of components of the invention.

In some embodiments consistent with the present disclosure, the processors 810 may be one or more microprocessors and/or ASICs. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a software defined network (SDN) controller, a laptop computer, desktop computer, a tablet computer, a mobile phone, or any device that has computing and networking capabilities.

§ 4.3 REFINEMENTS, ALTERNATIVES AND EXTENSIONS

As noted above, there are various methods for computing secondary (FRR-like) paths. As noted, these methods include, for example, RSVP-TE bypass LSPs, Loop Free Alternates (LFAs), Remote LFAs, and TI-LFAs. These may be computed on the router that uses them. Alternatively, an external application (e.g., on a control server, such as a software defined network (SDN) server), could be used to generate secondary (FRR-like) paths and install them into the data forwarding device(s). Since this could be thought of as a more centralized or controller-driven approach, one would expect that the generated secondary paths would be better than secondary paths generated locally, at the data forwarding device.

An example control server (just introduced above) could also create tunnels dynamically, in a reactionary model. For example, such a control sever could constantly monitor the interface utilization of all (or many) of the links in the network. For example, such a controller could (1) notice the congestion, (2) verify the situation by examining the routers along a given path or paths within the network, (3) run a traffic simulation, (4) identify an explicit secondary path, (5) provision an explicit path in the network, (6) route some set of the traffic onto the explicit secondary path, and (7) monitory the state of congestion. The congestion would be continuously monitored. If congestion on the original path eases, traffic may be sent over the original path instead of over the explicit secondary path.

Referring back to decision block 230 of FIG. 2, the first threshold (which may be referred to as a "utilization threshold) may be set to a relatively low value low utilization threshold (that is, lower than a threshold corresponding to a congestion condition) such that traffic may be constantly spread out from a given point of local repair (PLR), thereby augmenting the equal cost multi-path (ECMP) behavior of an IP network. This could be further augmented by weighting the in-use FRR path such that unequal cost multi-path (UECMP) is performed.

§ 4.4 EXAMPLE OF OPERATIONS OF AN EXAMPLE METHOD

Figure 9A:
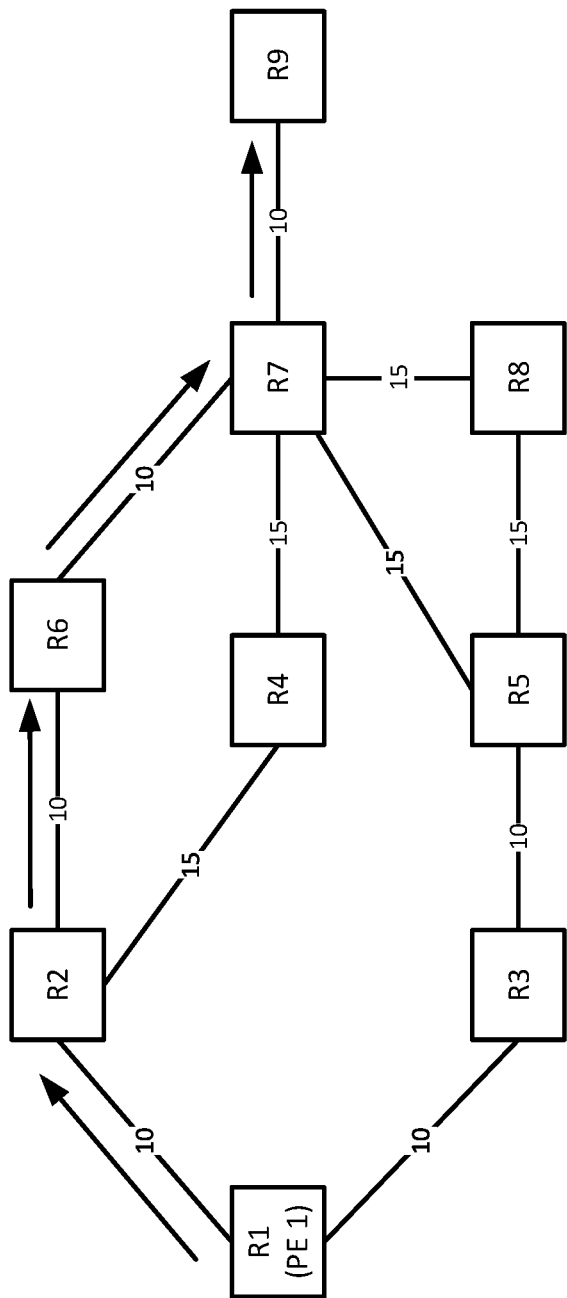
FIGS. 9A-9E illustrate operations of the example method in an example network.

FIGS. 9A-9E illustrate the use of the example method 200 in a simple example network topology 900. In the simple example network topology 900, each of R1-R9 is a router. Some of the routers are connected via communications links, which are depicted by lines having a cost metric value. For example, a link having a cost metric of 10 connects R2 and R6, while a link having a cost metric of 15 connects R2 and R4. Referring first to FIG. 9A, in the simple example network topology 900, the shortest (e.g., lowest cost) path from R1 to R9 is R1→R2→R6→R7→R9, as depicted by arrows. This shortest path first (SPF) or lowest cost path is the primary path. Consider router R2. A loop-free alternative (LFA) route is determined for the {R2,R6} link for use in the event of congestion. This may be done by R2 itself, or by another entity (e.g., a control server, not shown). The LFA route may be, for example, an IP tunnel (for native IP networks), or a label based (e.g., R-LFA, or TI-LFA) tunnel (for label distribution protocol (LDP) networks). The first threshold may be set (e.g., at 95% of link bandwidth).

Figure 9B:
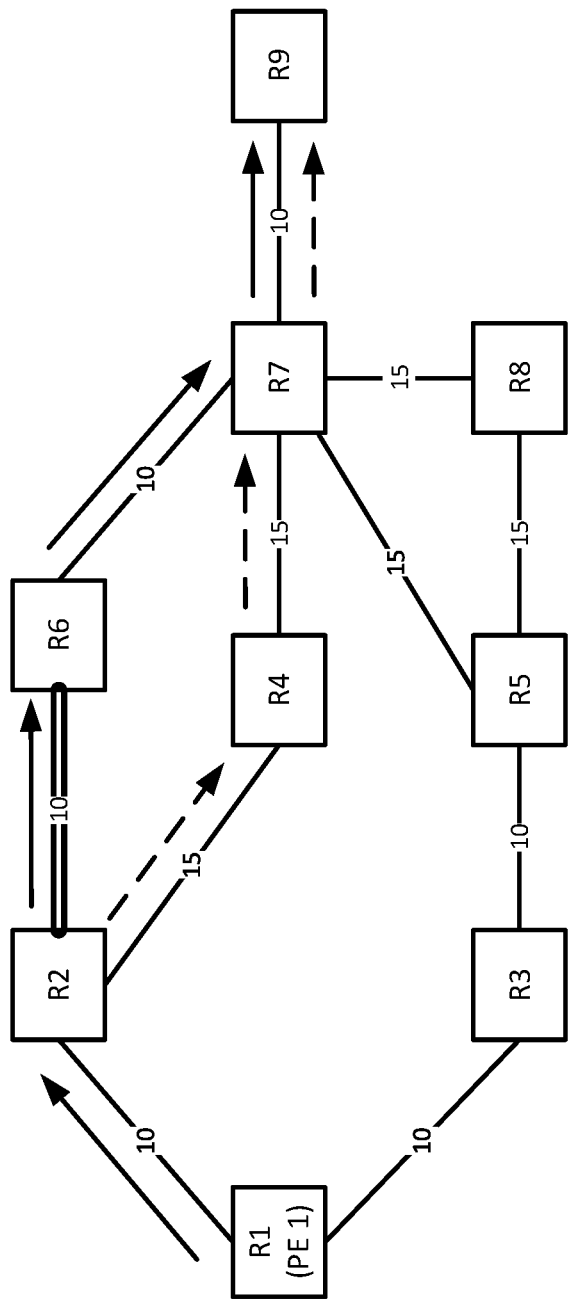

Congestion on the {R2,R6} link is monitored. (Recall, e.g., 220 of FIG. 2.) Referring to FIG. 9B, assume that congestion on the {R2,R6} link exceeds the first threshold (e.g., 95% of bandwidth) (Recall, e.g., 230, YES of FIG. 2.). This is depicted by heavy double line on the {R2,R6} link. In response, R2 starts diverting some traffic onto the LFA path (R2→R4→R7→R8) depicted by dashed links (Recall, e.g., 250 of FIG. 2.). The traffic diverted onto the LFA path by R2 may be performed such that traffic is load balanced between links {R2,R6} and {R2,R4}. Although not shown, there may be more than one LFA path (e.g., R2→R1→R3→R5→R7→R9). If there is more than one LFA, traffic diverted from the shortest path may be spread over two or more links in various ways (e.g., equally load balanced, with weighted load balancing based on the cost metrics of the links, with weighted load balancing based on cost metrics of the paths, etc.).

Figure 9C:
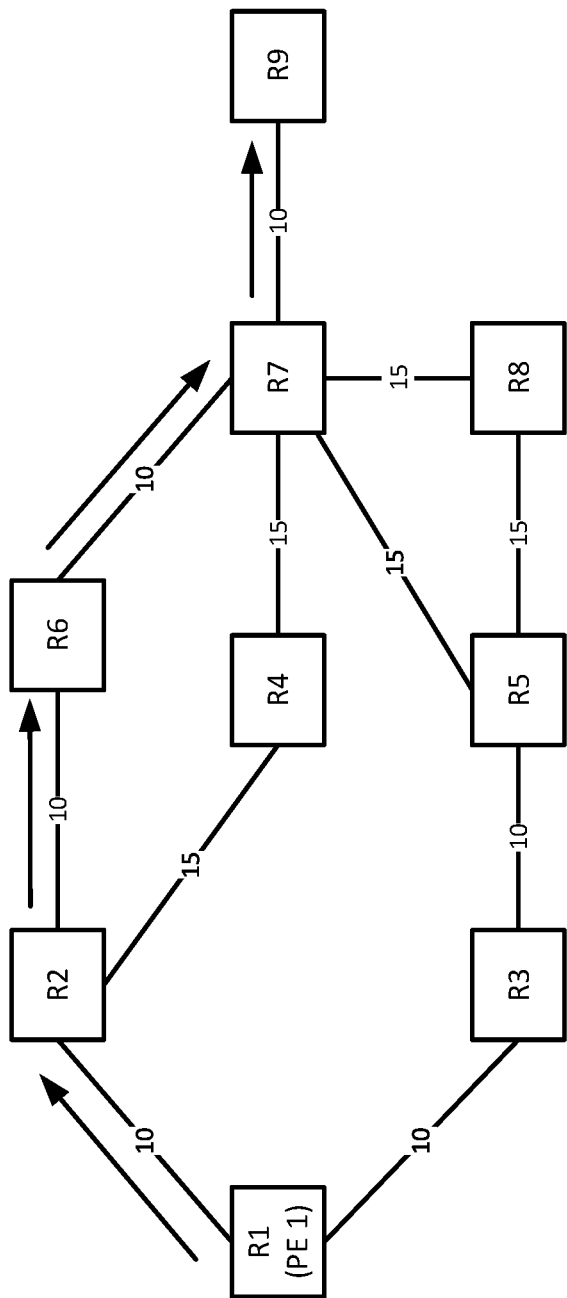
Figure 9D:
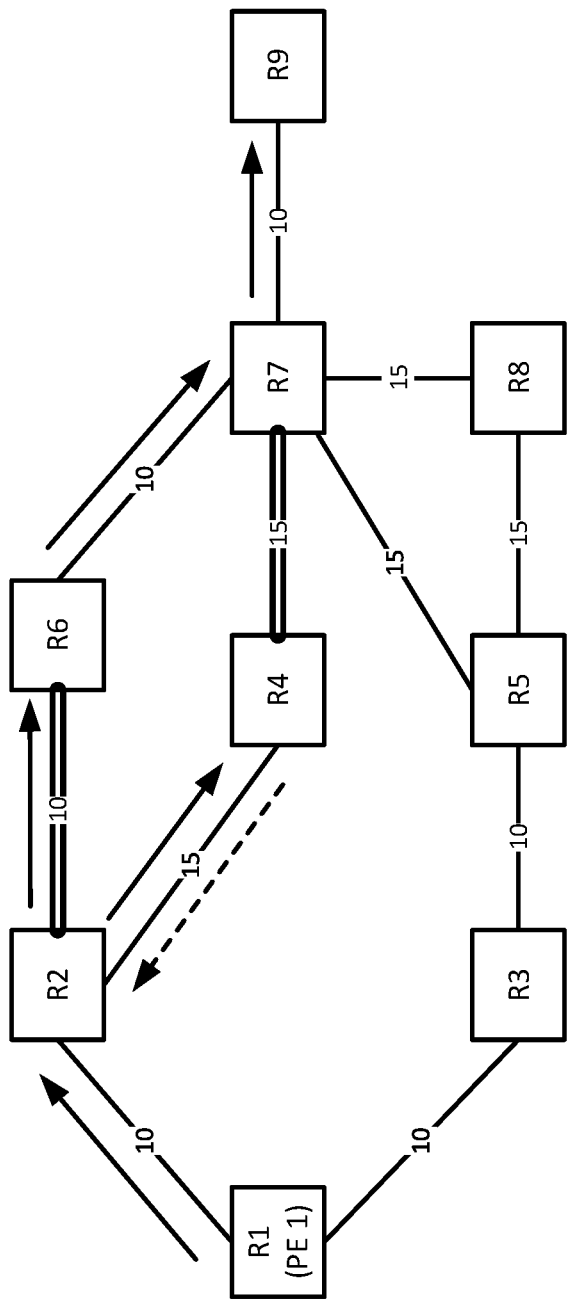

R2 will continue to monitor the collective (e.g., aggregated) congestion for the {R2,R6} link and connected links of any LFA(s) to which R2 diverts some traffic. (Recall, e.g., 260 of FIG. 2.) Referring to FIG. 9C, assume that the collective congestion falls below a second threshold (which may be the same as, or different from, the first threshold). (Recall, e.g., 270 of FIG. 2.) In such a case, R2 will go back to the initial state in which traffic destined for R9 will be forwarded via the {R2,R6} link. (Recall, e.g., 270, YES and 290 of FIG. 2.)

Figure 9E:
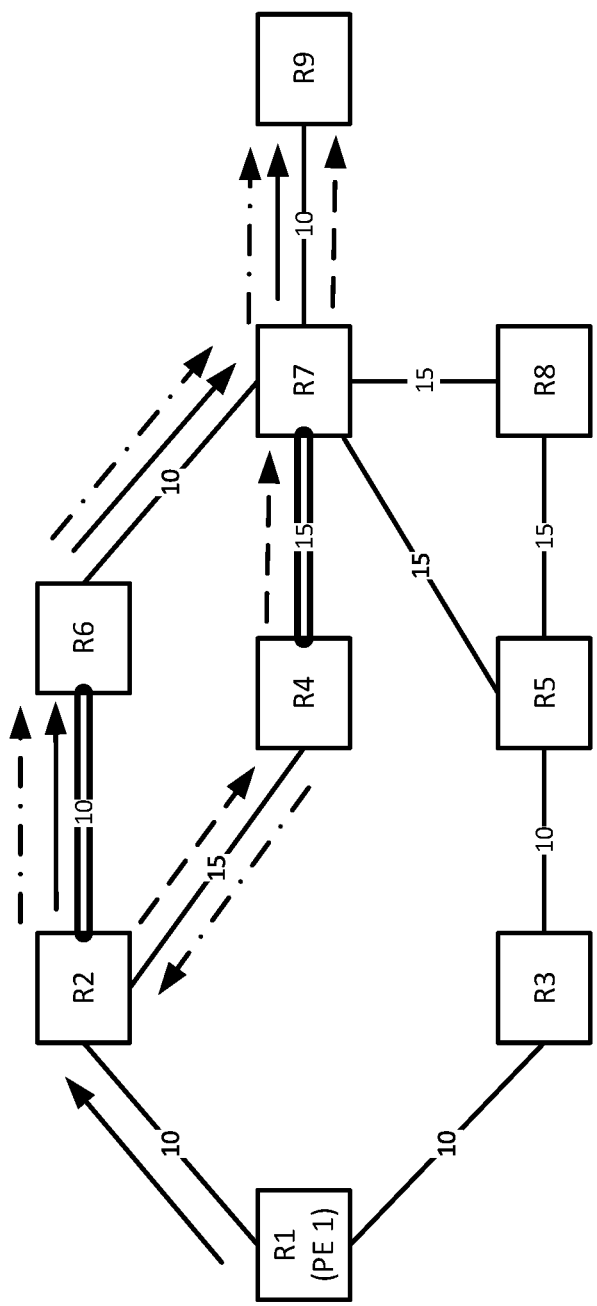

Although not shown, the example method 200 may be implemented on other routers in the network 900. Unfortunately, loops are possible in segment routed (SR) networks. (Segment routed networks are described, for example, in C. Filsfils, et al., "Segment Routing Architecture," *Request for Comments* 8402 (Internet Engineering Task Force, July 2018) (referred to as "RFC 8402" and incorporated herein by reference).) This is due to the predominance of use of loose-hops (to reduce label stack depth) when defining paths, and the lack of signaling of the path. For example, referring to FIG. 9D, assume that the {R4,R7} link becomes too congested (e.g., due to the LFA path from R2). Assume that R4 also has a LFA path for R9, and assume that this LFA path is via R2. Unfortunately, if R2's LFA for R9 is via R4, and R4's LFA for R9 is via R2, a loop is possible. See the dashed line and dot-dash line between R2 and R4. Referring to FIG. 9E, strict SPF (SSPF) segment identifiers (SIDs) may be used to avoid this situation. More specifically, R4's LFA may use SSPF SIDs (e.g., algorithm 1. See, e.g., section 3.1.1 of RFC 8402.) to avoid such a loop. More specifically, SSPF SID mandates that the packets are forwarded according to SPF algorithm and instructs any router in the path to ignore any possible local policy (such as the policy implemented by the example method 200) overriding the SPF decision. As shown in FIG. 9E, as indicated by the dot-dash arrows, R4 offloads some of its traffic for R9 to R2. R2 ignores its congestion policy and forwards this traffic to R9 via R6. Even though the {R2,R6} link may become congested, link congestion is preferred over loops. (Note that if R2's LFA path were provisioned as a SSPF, R4 would not send R9 traffic back through R2, and congestion on the {R4,R7} link would be the price of avoiding the loop.

§ 4.5 CONCLUSIONS

Traditionally, FRR paths were pre-computed and installed, being inactive until a Point of Local Repair (PLR) detected a failure of an out-going interface or next-hop node. Example embodiments consistent with the present description can use dynamically computed bypass LSPs and/or LFA/R-LFA or TI-LFAs that may have already been computed and available for FRR. With example embodiments consistent with the present description, the same PLRs (which include most, if not all, nodes in the network) that pre-compute FRR paths, can be used monitor the outgoing utilization of their local interfaces and define "congestion" with a given utilization threshold (e.g., congested if greater 95% utilization and not-congested if less than or equal to 95% utilization). Thus, if the outgoing interface utilization threshold is crossed, "congestion" is deemed to have occurred, and the PLR will start to use the FRR path(s) for forwarding data in addition to the congested outgoing interface(s), thereby augmenting the available bandwidth with the additional FRR path.

To reiterate, FRR paths often already exist in the network, but are only used during failure conditions. Example embodiments consistent with the present description can be thought of as adding policy to treat congestion similarly to a failure condition, but with the FRR paths being treated as an active resource extension attribute (to supplement the primary (e.g., SPF) path), not simply as an inactive, standby resource that receives all (not just some) data upon the failure (not just congestion) of a link or node.

Using an LFA path (also referred to as a "Tactical TE Tunnel", such as a TI-LFA) from the perspective a point of congestion (POC) is advantageous since it is loop free, and since, for many topologies, a network operator only needs to make sure that the network has enough capacity to carry the traffic along the post-convergence path after a failure anyway.

What is claimed is:

1. A computer-implemented method for use by a data forwarding device having (1) a first interface with a first link to a downstream data forwarding device of a shortest/preferred primary path and (2) second interface with a second link to a downstream data forwarding device of a loop-free alternative (LFA) backup path, the computer-implemented method comprising:
   a) configuring the second interface as part of the loop-free alternate (LFA) backup path to a destination device, wherein the first interface is part of the shortest/preferred primary path to the destination device;
   b) monitoring congestion at the first interface to determine whether or not the congestion of the shortest/preferred primary path exceeds a first threshold;
   c) responsive to a determination that the congestion of the shortest/preferred primary path exceeds the first threshold,
      forwarding at least some data addressed to the destination device, over the LFA backup path via the second interface instead of over the shortest/preferred primary path via the first interface, thereby alleviating congestion at the first interface,
      monitoring a sum of (1) congestion at the first interface and (2) congestion at the second interface, to define collective congestion,
      determining whether or not the collective congestion falls below a second threshold, and
      responsive to a determination that the collective congestion falls below the second threshold, redirecting at least some data addressed to the destination device from the LFA backup path via the second interface to the preferred/shortest path via the first interface, and
      otherwise, responsive to a determination that the collective congestion does not fall below the second threshold, continuing to forward at least some data addressed to the destination device, over the LFA backup path via the second interface instead of over the shortest/preferred primary path via the first interface, and
   otherwise, responsive to a determination that the congestion of the shortest/preferred primary path does not exceed the first threshold, not forwarding any data addressed to the destination device, over the LFA backup path via the second interface instead of over the shortest/preferred primary path via the first interface.

2. The computer-implemented method of claim 1 wherein the second threshold is the same as the threshold.

3. The computer-implemented method of claim 1 wherein the second threshold is different from the threshold.

4. The computer-implemented method of claim 1 wherein the LFA backup path is either a remote LFA path, or a topology independent LFA path.

5. The computer-implemented method of claim 1 wherein the data forwarding device belongs to a network domain employing segment routing (SR), and
   wherein the LFA backup path is defined using strict segment identifier (SSID).

6. The computer-implemented method of claim 1 wherein the first link has a lower cost metric than that of the second link.

7. The computer-implemented method of claim 1, wherein the act of forwarding at least some data addressed to the destination device, over the LFA backup path via the second interface instead of over the shortest/preferred primary path via the first interface, thereby alleviating congestion at the first interface, forwards some, but not all, of the data addressed to the destination device, over the LFA backup path via the second interface.

8. A computer-implemented method for use by a data forwarding device having (1) a first interface with a first link to a downstream data forwarding device of a shortest/preferred primary path and (2) second interface with a second link to a downstream data forwarding device of a loop-free alternative (LFA) backup path, the computer-implemented method comprising:
   a) configuring the second interface as part of the loop-free alternate (LFA) backup path to a destination device, wherein the first interface is part of the shortest/preferred primary path to the destination device;
   b) monitoring congestion at the first interface to determine whether or not the congestion of the shortest/preferred primary path exceeds a first threshold;
   c) responsive to a determination that the congestion of the shortest/preferred primary path exceeds the first threshold, forwarding at least some data addressed to the destination device, over the LFA backup path via the second interface instead of over the shortest/preferred primary path via the first interface, thereby alleviating congestion at the first interface, and
      otherwise, responsive to a determination that the congestion of the shortest/preferred primary path does not exceed the first threshold, not forwarding any data addressed to the destination device, over the LFA backup path via the second interface instead of over the shortest/preferred primary path via the first interface,
      wherein the LFA backup path is defined by strict shortest path first (SSPF) segment identifiers (SIDs) whereby the at least some data forwarded over the LFA backup path via the second interface instead of over the shortest/preferred primary path via the first interface cannot be looped back to the data forwarding device because any local policy of any router in the LFA backup path is overridden by SSPF.

9. A data forwarding device comprising:
   a) a first interface with a first link to a downstream data forwarding device, wherein the first interface is part of a shortest/preferred primary path to a destination device;
   b) a second interface with a second link to a downstream data forwarding device, wherein the second interface is configured as part of a loop-free alternate (LFA) backup path to the destination device;

c) at least one processor; and
d) a computer-readable storage medium storing processor-executable instructions which, when executed by the at least one processor, cause the at least one processor to perform a method including
   1) monitoring congestion at the first interface to determine whether or not the congestion exceeds a first threshold, and
   2) responsive to a determination that the congestion exceeds the first threshold,
      forwarding at least some data addressed to the destination device, over the LFA backup path via the second interface instead of over the shortest/preferred primary path via the first interface, thereby alleviating congestion at the first interface,
      monitoring a sum of (1) congestion at the first interface and (2) congestion at the second interface, to define collective congestion,
      determining whether or not the collective congestion falls below a second threshold, and
      responsive to a determination that the collective congestion falls below the second threshold, redirecting at least some data addressed to the destination device from the LFA backup path via the second interface to the preferred/shortest path via the first interface, and
         otherwise, responsive to a determination that the collective congestion does not fall below the second threshold, continuing to forward at least some data addressed to the destination device, over the LFA backup path via the second interface instead of over the shortest/preferred primary path via the first interface, and
         otherwise, responsive to a determination that the congestion does not exceed the first threshold, not forwarding any data addressed to the destination device, over the LFA backup path via the second interface instead of over the shortest/preferred primary path via the first interface.

10. The data forwarding device of claim 9 wherein the second threshold is the same as the threshold.

11. The data forwarding device of claim 9 wherein the second threshold is different from the threshold.

12. The data forwarding device of claim 9 wherein the LFA backup path is either a remote LFA path, or a topology independent LFA path.

13. The data forwarding device of claim 9 wherein the data forwarding device belongs to a network domain employing segment routing (SR), and
   wherein the LFA backup path is defined using strict segment identifier (SSID).

14. The data forwarding device of claim 9 wherein the first link has a lower cost metric than that of the second link.

15. The data forwarding device of claim 9, wherein the act of forwarding at least some data addressed to the destination device, over the LFA backup path via the second interface instead of over the shortest/preferred primary path via the first interface, thereby alleviating congestion at the first interface, forwards some, but not all, of the data addressed to the destination device, over the LFA backup path via the second interface.

16. A data forwarding device comprising:
a) a first interface with a first link to a downstream data forwarding device, wherein the first interface is part of a shortest/preferred primary path to a destination device;
b) a second interface with a second link to a downstream data forwarding device, wherein the second interface is configured as part of a loop-free alternate (LFA) backup path to the destination device;
c) at least one processor; and
d) a computer-readable storage medium storing processor-executable instructions which, when executed by the at least one processor, cause the at least one processor to perform a method including
   1) monitoring congestion at the first interface to determine whether or not the congestion exceeds a first threshold, and
   2) responsive to a determination that the congestion exceeds the first threshold, forwarding at least some data addressed to the destination device, over the LFA backup path via the second interface instead of over the shortest/preferred primary path via the first interface, thereby alleviating congestion at the first interface, and
      otherwise, responsive to a determination that the congestion does not exceed the first threshold, not forwarding any data addressed to the destination device, over the LFA backup path via the second interface instead of over the shortest/preferred primary path via the first interface,
   wherein the LFA backup path is defined by strict shortest path first (SSPF) segment identifiers (SIDs) whereby the at least some data forwarded over the LFA backup path via the second interface instead of over the shortest/preferred primary path via the first interface cannot be looped back to the data forwarding device because any local policy of any router in the LFA backup path is overridden by SSPF.

17. A non-transitory computer-readable storage medium storing processor-executable instructions which, when executed by at least one processor of a data forwarding device having (1) a first interface with a first link to a downstream data forwarding device and (2) second interface with a second link to a downstream data forwarding device, cause the data forwarding device to perform a method comprising:
a) configuring the second interface as part of a loop-free alternate (LFA) backup path to a destination device, wherein the first interface is part of a shortest/preferred primary path to the destination device;
b) monitoring congestion at the first interface to determine whether or not the congestion exceeds a first threshold;
c) responsive to a determination that the congestion exceeds the first threshold,
   forwarding at least some data addressed to the destination device, over the LFA backup path via the second interface instead of over the shortest/preferred primary path via the first interface, thereby alleviating congestion at the first interface,
   monitoring a sum of (1) congestion at the first interface and (2) congestion at the second interface, to define collective congestion,
   determining whether or not the collective congestion falls below a second threshold, and
   responsive to a determination that the collective congestion falls below the second threshold, redirecting at least some data addressed to the destination device from the LFA backup path via the second interface to the preferred/shortest path via the first interface, and
      otherwise, responsive to a determination that the collective congestion does not fall below the second threshold, continuing to forward at least some data addressed to the destination device, over the LFA backup path via the second interface instead of over the shortest/preferred primary path via the first interface, and otherwise, responsive to a determination that the congestion does not exceed the first threshold, not forwarding any data addressed to the destination device, over the LFA backup path via the second interface instead of over the shortest/preferred primary path via the first interface.

18. A non-transitory computer-readable storage medium storing processor-executable instructions which, when executed by at least one processor of a data forwarding device having (1) a first interface with a first link to a downstream data forwarding device and (2) second interface with a second link to a downstream data forwarding device, cause the data forwarding device to perform a method comprising:

a) configuring the second interface as part of a loop-free alternate (LFA) backup path to a destination device, wherein the first interface is part of a shortest/preferred primary path to the destination device;

b) monitoring congestion at the first interface to determine whether or not the congestion exceeds a first threshold;

c) responsive to a determination that the congestion exceeds the first threshold, forwarding at least some data addressed to the destination device, over the LFA backup path via the second interface instead of over the shortest/preferred primary path via the first interface, thereby alleviating congestion at the first interface, and otherwise, responsive to a determination that the congestion does not exceed the first threshold, not forwarding any data addressed to the destination device, over the LFA backup path via the second interface instead of over the shortest/preferred primary path via the first interface, wherein the LFA backup path is defined by strict shortest path first (SSPF) segment identifiers (SIDs) whereby the at least some data forwarded over the LFA backup path via the second interface instead of over the shortest/preferred primary path via the first interface cannot be looped back to the data forwarding device because any local policy of any router in the LFA backup path is overridden by SSPF.

\* \* \* \* \*